Figure 1:
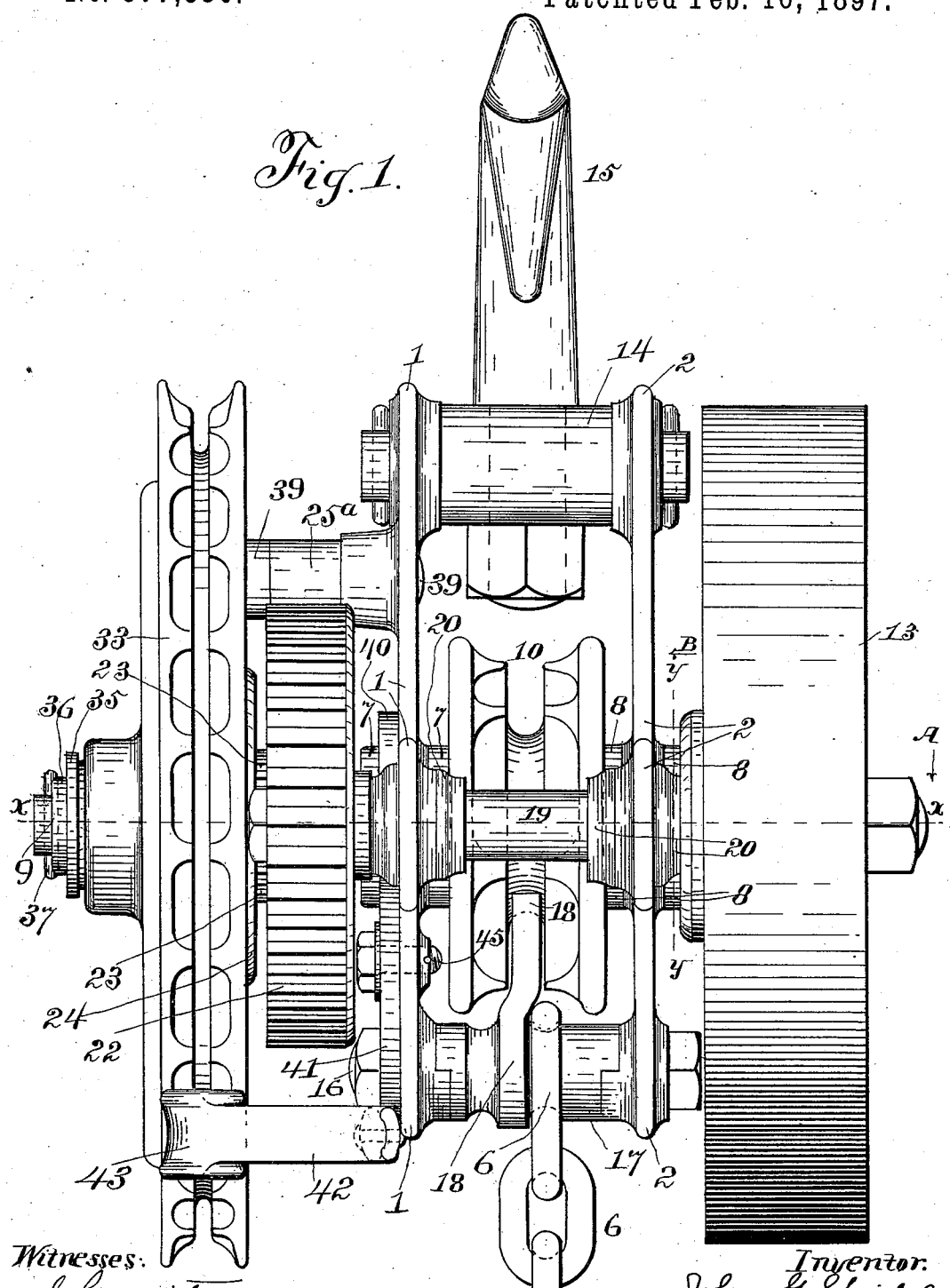

(No Model.)　　　　　　　　　　　　　　　　5 Sheets—Sheet 1.
J. G. SPEIDEL.
HOISTING APPARATUS.

No. 577,330.　　　　　　　　　Patented Feb. 16, 1897.

Witnesses:
John Stumpf

Inventor.
John G. Speidel
By
Attorney.

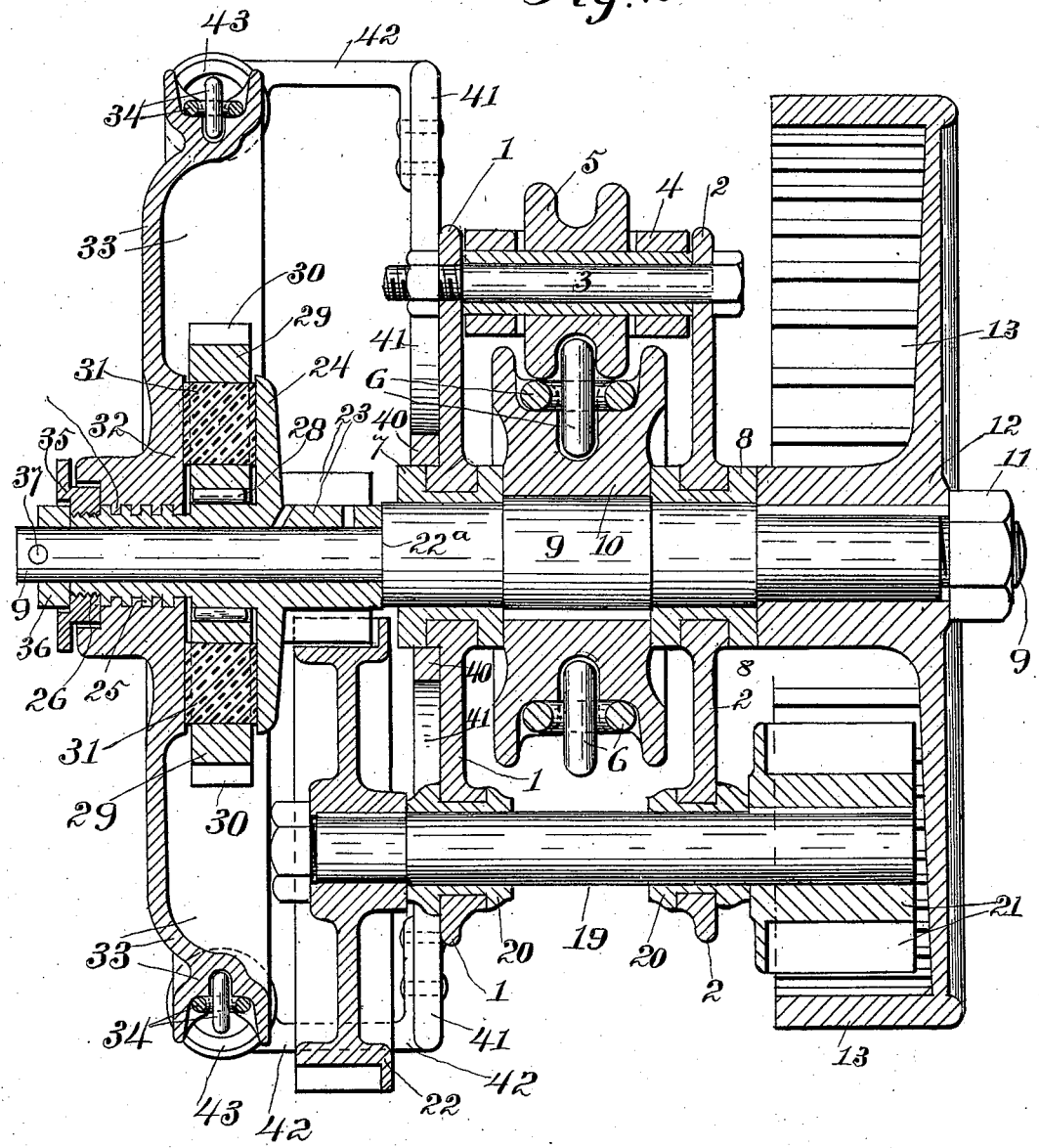

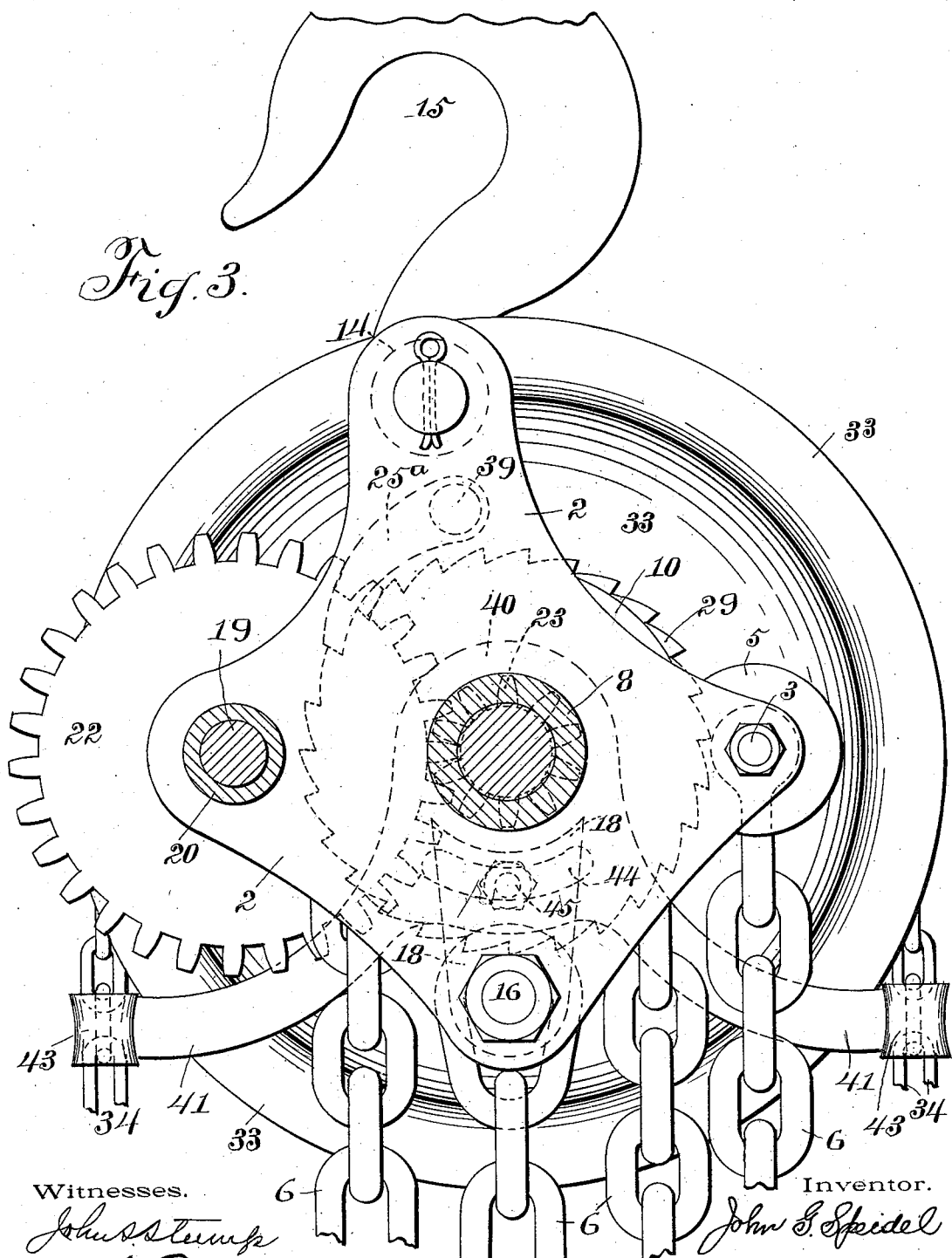

(No Model.) 5 Sheets—Sheet 4.
J. G. SPEIDEL.
HOISTING APPARATUS.
No. 577,330. Patented Feb. 16, 1897.
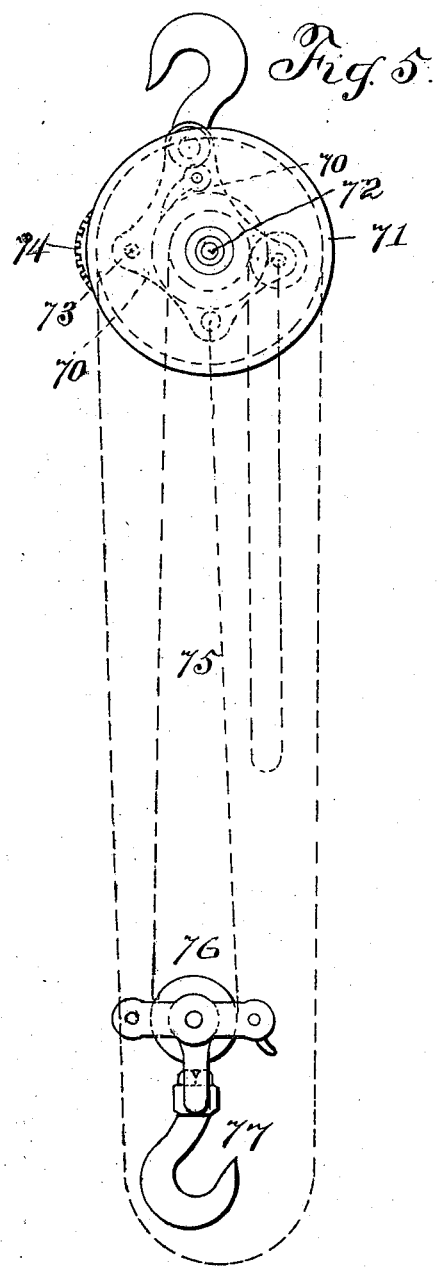
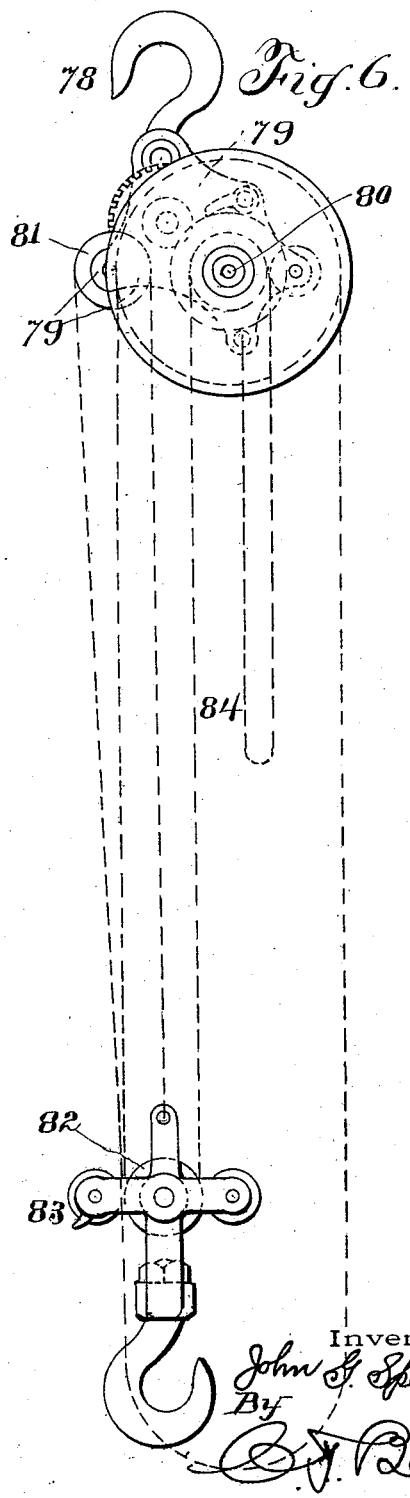

(No Model.) 5 Sheets—Sheet 5.
J. G. SPEIDEL.
HOISTING APPARATUS.
No. 577,330. Patented Feb. 16, 1897.
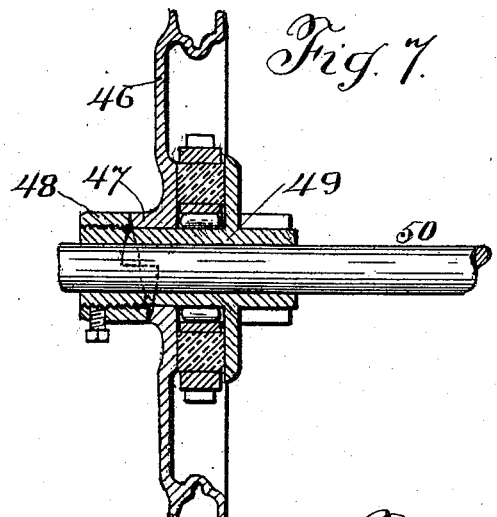
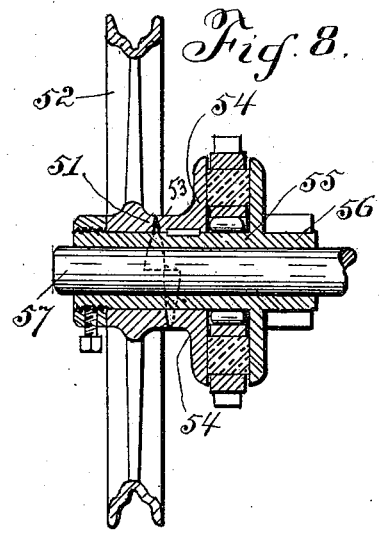
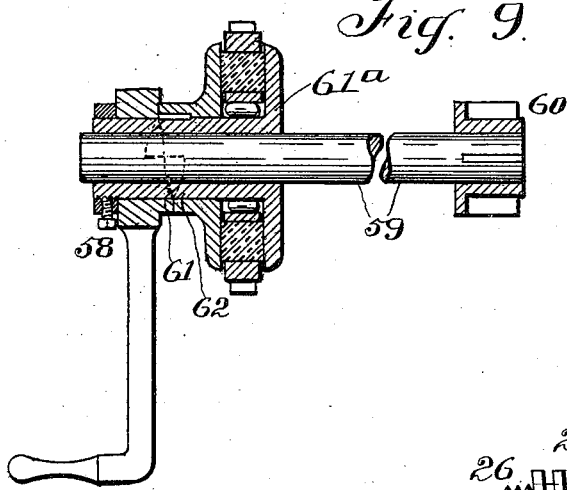
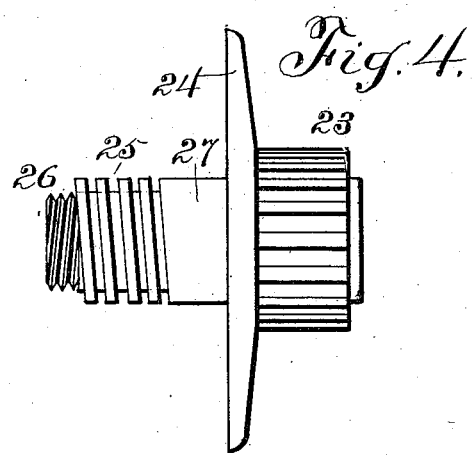
Witnesses.
John A. Stump
Inventor.
John G. Speidel
By
Attorney.

UNITED STATES PATENT OFFICE.

JOHN G. SPEIDEL, OF READING, PENNSYLVANIA.

HOISTING APPARATUS.

SPECIFICATION forming part of Letters Patent No. 577,330, dated February 16, 1897.

Application filed May 22, 1896. Serial No. 592,667. (No model.)

*To all whom it may concern:*

Be it known that I, JOHN G. SPEIDEL, a citizen of the United States, residing at Reading, in the county of Berks and State of Pennsylvania, have invented certain new and useful Improvements in Hoisting Apparatus, of which the following is a specification.

The present invention relates to hoisting machinery, such as elevators, cranes, windlasses, and pulley-blocks, whether fixed or portable; and the object of the invention is to provide an improved hoisting apparatus of new and novel construction.

A further object of the invention is to provide a frame of peculiar construction and arrangement of parts to carry the working elements of the apparatus.

A further object of the invention is to provide an automatic brake mechanism, complete in itself, to instantly stop the operation of the apparatus in hoisting or lowering by simply ceasing to operate the hand-chain sheave or wheel.

A still further object of the invention is to provide an oscillating guide for the hand-chain.

Other objects and advantages accruing from the improved construction of my apparatus will be hereinafter revealed, and pointed out in the appended claims.

The invention consists in the novel construction and arrangement of parts, and resides, essentially, in the automatic brake mechanism and the oscillating chain-guide.

In the accompanying drawings, forming part of this application, Figure 1 is a front elevation of my hoisting apparatus with hand-chain and lift-chain partly broken away. Fig. 2 is a section on the line $x\ x$, Fig. 1, looking in the direction indicated by the arrow A, with all chains attached. Fig. 3 is a section on the line $y\ y$, Fig. 1, looking in the direction indicated by the arrow B, with all chains attached. Fig. 4 is a detached elevation of the pinion having its hub provided with square and V threads. Fig. 5 is an end elevation of the portable chain-hoist with the lower hook-block and chain complete. Fig. 6 is a similar view of a modification. Fig. 7 is a sectional view of a modification of the brake mechanism. Fig. 8 is a similar view of a further modification. Fig. 9 is a like view of a still further modification.

The same numeral references denote the same parts throughout the several figures of the drawings.

The frame comprises oppositely-situated plate members 1 and 2, connected together by the bolt 3, having a distance-sleeve 4 to fix the plates at a proper distance apart, and a guide-sheave 5 on the same bolt for a lift-chain 6. The centers of the plates 1 and 2 have an opening provided with bearings 7 and 8 for the main shaft 9, which carries the hoisting sprocket wheel or drum 10 between the said bearings 7 and 8. This shaft 9 extends throughout the apparatus and is without screw-threads, except at the end, where it is provided with a nut 11, which engages the hub 12 of the internally-geared balance-wheel 13, keyed to the said shaft 9. A washer and pin may be substituted for the screw and nut.

At the top of the frame is a cross-head 14, with a suspending-hook 15, and at the bottom of the frame there is a bolt 16, having a distance-sleeve 17 to keep the lower ends of the plates 1 and 2 fixed apart. One end of the lift-chain 6 is secured to the sleeve 17, and the latter has an upward projection or chain-shield 18, which extends upward between the flanges of the drum 10 and keeps the lift-chain hanging straight from the periphery of the drum and prevents the said wheel from carrying the drive or lift chain entirely around, and thus block the operation of the machine. Thus it will be observed that one end of the lift-chain being secured to the bolt 16 and the other end to the bolt 3, with the load intervening, one-half the latter is carried by this bolt 16.

19 is a shaft extending through the bearings 20 in the plates 1 and 2, upon one end of which is secured a pinion 21, meshing with the balance gear-wheel 13, and upon the other end is fixed a gear-wheel 22. This shaft also holds the plates at a proper distance apart at this point.

The gear 22 meshes with the pinion 23 upon a reduced portion of the shaft 9, abutting against a shoulder $22^a$ of the said shaft, said pinion having an integral flange 24 and a hub provided with a coarse square screw-thread 25 and a V-thread 26 upon its outer end. These threads run in opposite directions, that is, when the square thread is right-handed the V-thread should be left-handed. Upon the hub of the pinion 23, between the flange 21 and the thread 25, is left a cylindrical surface 27 for antifriction-rollers 28, housed in the hub of the brake-wheel 29, having ratchet-teeth 30. The wheel 29 has frictional bearings 31, which project beyond the sides of the wheel, the surface on one side engaging the flange 24, and the surface on the other side is engaged by the inner face of the hub 32 of the sprocket-wheel 33, carrying the hand-chain 34. It will be observed that the pinion, brake-wheel, and the hand-wheel constitute the automatic brake complete in itself, and applicable to various forms of hoisting apparatus. The outer face of the hub 32 has a circular cavity in which is fitted a screw-gland 35, held engaged with the V-thread 26 by a washer 36 and a pin 37. This form of hub end and gland forms a perfect dust-guard for the square thread and the roller-bearings in the brake-wheel. From the said hub-cavity to its inner surface or face the hub has a square thread 38, which meshes with the thread 25. A stud 39 is secured to the plate 1 above the brake-wheel 29 and carries a pawl $25^a$, which permanently engages the teeth 30 of said wheel.

It will be observed that the square thread of the pinion and the like thread of the hand-wheel form the coupling between the said wheel and pinion.

The hand-chain guide consists of a head 40, loosely mounted upon the bearing 7, and has curved arms 41, diverging outwardly, which are provided with wings 42, carrying guide-eyes 43 for the hand-chain below and opposite the periphery of the hand-chain wheel 33. The guide-head has a curved slot 44, through which a set-bolt 45 extends into the frame-plate 1. This set-bolt is left loose to allow the chain-guide to swing or oscillate freely on its pivot when the hand-chain below the guide-eyes is pulled away from vertical position, leaving the chain above the eyes in perfect alinement with the periphery of the hand-wheel, thus unnecessarily avoiding friction between the chain and guide. Should it be desired not to have the chain-guide oscillate, the set-bolt has simply to be tightened, which will fix the guide rigid with the frame-plate 1.

Referring to the portable chain-hoist shown in Fig. 5, the frame 70 carries a balance-wheel 71 upon a shaft 72. A supplemental shaft 73 carries a gear-wheel 74, meshing with a pinion on shaft 72, and one chain 75, carrying a pulley-block 76, having swivel-hook 77, acts as a combined hand and lift chain.

In Fig. 6 is an extended frame 79 to throw the suspending-hook 78 off from the central shaft 80. A pulley 81 is journaled in and stands out from the frame 79, over which pulley and a pulley 82 of hook-block 83 the lift-chain 84 passes. The gearing of the hoisting apparatus is like that hereinbefore described.

Referring to the modifications of the brake mechanism, as shown in Fig. 7, the square thread is omitted from the hand-chain wheel and from the hub of the pinion, and in lieu thereof the hub of the hand-wheel 46 forms one member 47 of a spiral cam-coupling, and the other member 48 is formed by a washer screw-threaded into the pinion-hub 49, loosely mounted upon a shaft 50.

In Fig. 8 one spiral-cam-coupling member 51 is formed upon the inner hub-face of a hand-chain wheel 52, and the other spiral-coupling member 53 is formed by the hub of a flange 54, keyed to the hub 55 of a pinion 56, loosely mounted upon a shaft 57.

As shown in Fig. 9, the brake is used on a hoist with a single gear. A hand-crank 58 is substituted for the chain-wheels, hereinbefore referred to, on the shaft 59 at one end, and on the other is secured a pinion 60, the hub of the crank 58 forming one spiral-coupling member 61, and the other member 62 is formed by the hub of a flange $61^a$, loose on the said shaft.

By operating the chain wheel or crank in the foregoing-described modifications the same results are attained as by the brake mechanism first described in this specification, the operation of which, as well as that of the whole hoisting apparatus, will now be set out: The wheel 33, being turned by pulling the hand-chain 43 downwardly on the left of Fig. 2, will operate the square-threaded portion of the said wheel and the pinion 23 and draw the pinion, with its flange 24, hard against the brake-wheel 29 and cause the latter to make a frictional lock between the hub 32 of the said wheel and the flange 24, and a continued like pull on the hand-chain will operate the gear-wheel 23, turn the shaft 19, which imparts motion to the wheel 13 through the pinion 21, and operate the lift sheave or drum 10 to hoist a load. As soon as the pull on the hand-chain has ceased the wheel 33 will be checked and stopped by the pawl $25^a$ engaging the teeth 30 of the brake-wheel 29, which completely stops the whole apparatus and holds the load immovable vertically. To lower the load, the hand-wheel is turned to the right in Fig. 2, which operates the aforesaid square threads and unlocks the brake-wheel from between the pinion-flange and chain-wheel hub, and by a continued turn of the hand-chain wheel in this direction the lowering operation of the apparatus is completed.

I do not wish to be understood as limiting myself in the application of my invention to any particular hoist or to the specific construction of my automatic brake; but, Having described my invention, what I claim as new, and desire to secure by Letters Patent, is—

1. The combination with a hoisting apparatus, of an automatic brake mechanism comprising a pinion provided with an integral hub having a coupling end, a hand-wheel provided with an integral hub having a like coupling end, and a brake-wheel loosely mounted upon said pinion-hub to make a frictional brake by locking the said two hubs together.

2. The combination with a hoisting apparatus, of an automatic brake mechanism, comprising a pinion provided with an integral hub having a coupling portion, a hand-wheel mounted to turn on the pinion-hub and having an integral hub provided with a like coupling portion and having the hub of the said pinion-hub extending therethrough, and a brake-wheel loosely mounted upon the pinion-hub and adapted to make a frictional brake between the wheel and pinion by locking the two said coupling portions together, as set forth.

3. The combination with a drum and threadless shaft of an elevator apparatus, a pinion turning and traveling on the shaft and having its hub formed into a coupling member, a coupling member mounted upon the pinion-hub and adapted to lock with the latter, a brake-wheel loosely mounted on said pinion-hub, a suitable gear from the pinion to the shaft to impart motion to the latter, as set forth.

4. The combination with a lift-drum, its threadless driving-shaft, and shaft-gearing, of a pinion loosely turning and traveling upon the shaft and having a threaded hub and an integral flange, a drive-wheel mounted on the pinion-hub and having a thread meshing with the thread of the pinion whereby the wheel and pinion are connected to be locked together, and a friction brake-wheel loosely mounted upon the pinion-hub and adapted to make a frictional brake between the said pinion-flange and wheel-hub face to impart motion to said gearing and shaft, as set forth.

5. The combination with a portable hoist, of a frame in which the hoist mechanism is secured, comprising side plates, a series of bearings secured in openings of the plates at equal radial distance from the center of the plates, a shaft in certain of said bearings, sleeves upon the bolts fixing the plates at proper distance apart, and a head attached to the plates and carrying a hook for suspending the hoist, as set forth.

6. The combination in a portable hoist, a frame comprising side plates, bearings contained in the plates at equal radial distance from the center of the frame, and connected together by bolts, sleeves upon the bolts fixing the distance between the plates, a lift-drum upon the shaft between the plates and adapted to be revolved inside of the said bolts, an automatic brake mechanism loosely mounted upon the shaft, a pawl carried by one of the said plates and adapted to operate with the brake mechanism, a shaft journaled in the frame-plates, and gears to impart motion from the brake mechanism to the driving-shaft.

7. The combination with a hoisting-machine, of a chain-guide comprising a slotted head loosely mounted upon the main shaft of the machine near its center and remote from the hand-wheel of the machine, a set-screw passing through said slot and extending into the frame, outwardly-diverging curved arms, wings detachably secured to and extending at right angles from said arms, and terminating at the periphery of the hand-wheel, and eyes formed at the terminal of the wings, whereby the eyes only are adjacent to said wheel, as set forth.

In witness whereof I hereunto set my hand in the presence of two witnesses.

JOHN G. SPEIDEL.

Witnesses:
   HENRY J. SMITH,
   F. PIERCE HUMMEL.